Feb. 22, 1966
E. W. ILLGEN
3,236,080
PROCEDURE AND DEVICE FOR THE SHAPING OF
CONTAINERS, CONTAINER BODIES OR
CONTAINER PARTS, FROM A
THIN-WALLED FIRST SHAPE
Filed July 9, 1962
3 Sheets-Sheet 1
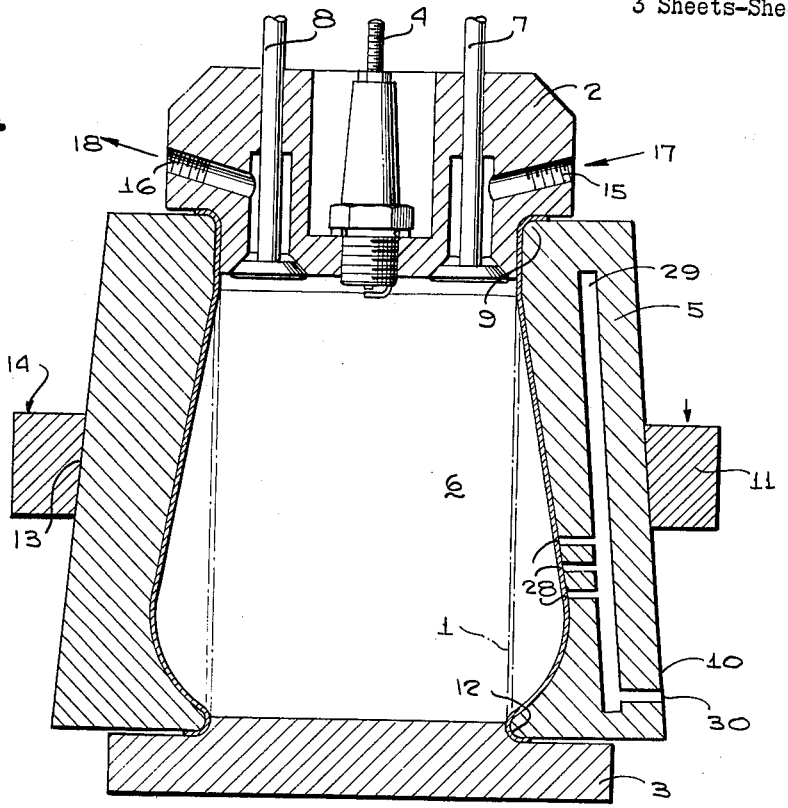
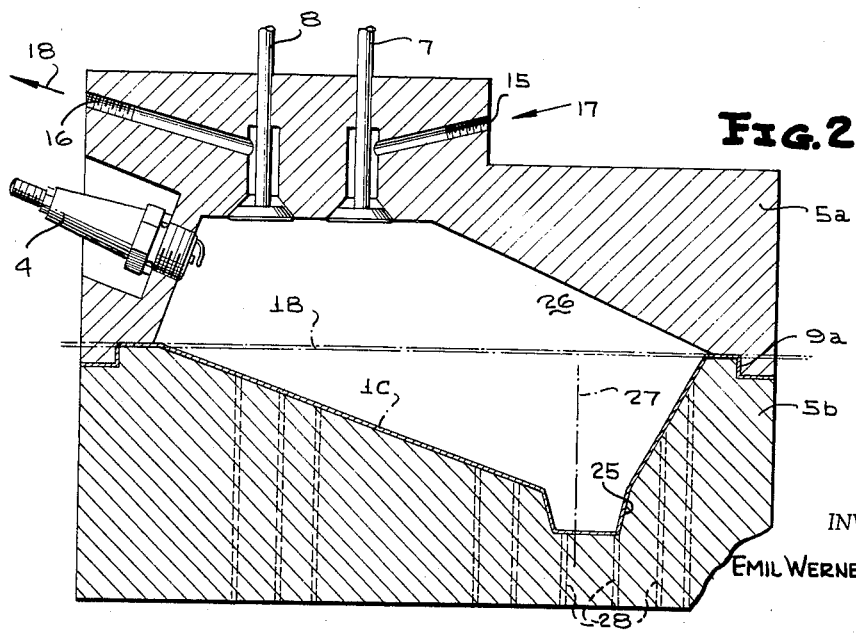
INVENTOR
EMIL WERNER ILLGEN
BY
Mason, Porter, Diller & Stewart
ATTORNEYS Feb. 22, 1966 E. W. ILLGEN 3,236,080
PROCEDURE AND DEVICE FOR THE SHAPING OF
CONTAINERS, CONTAINER BODIES OR
CONTAINER PARTS, FROM A
Filed July 9, 1962 THIN-WALLED FIRST SHAPE
3 Sheets-Sheet 2
FIG.3
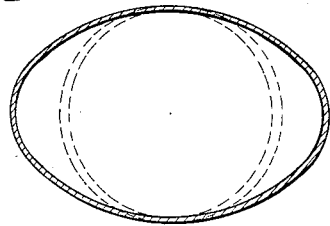
FIG.4
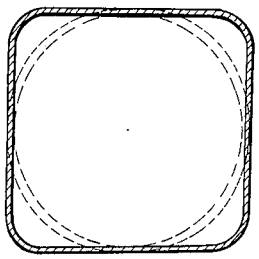
FIG.5
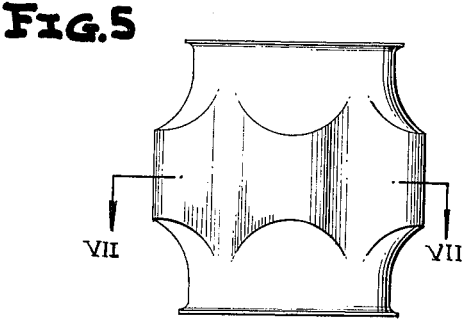
FIG.6
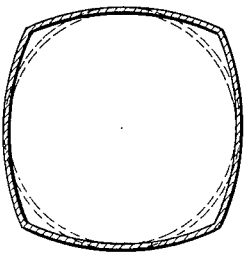
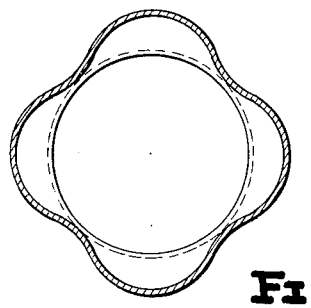
FIG.7
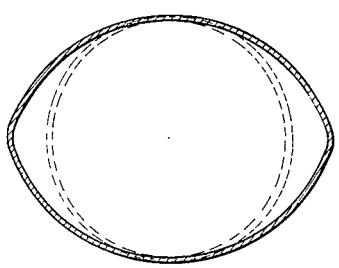
FIG.8
FIG.9
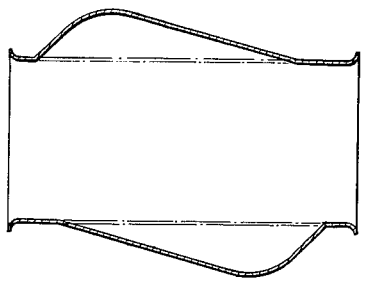
INVENTOR
EMIL WERNER ILLGEN
BY Mason, Porter, Diller & Stewart
ATTORNEYS Feb. 22, 1966 E. W. ILLGEN 3,236,080
PROCEDURE AND DEVICE FOR THE SHAPING OF
CONTAINERS, CONTAINER BODIES OR
CONTAINER PARTS, FROM A
THIN-WALLED FIRST SHAPE
Filed July 9, 1962 3 Sheets-Sheet 3
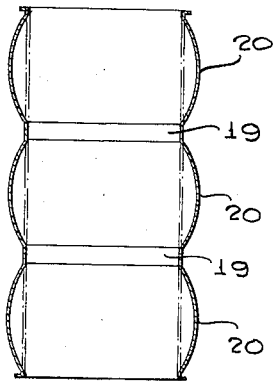
FIG. 10
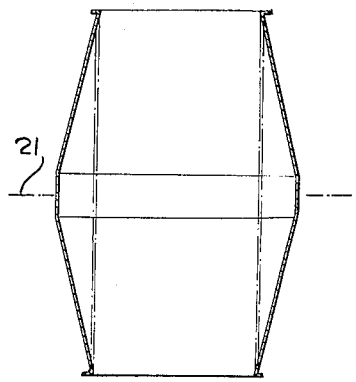
FIG. 11
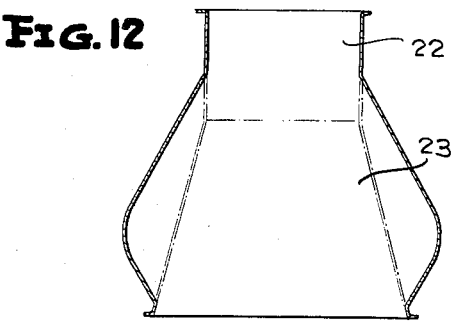
FIG. 12
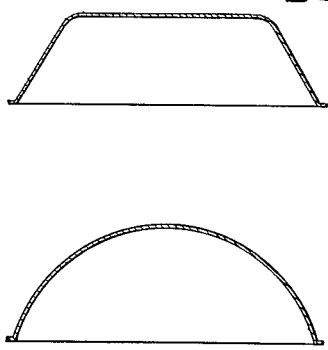
FIG. 13
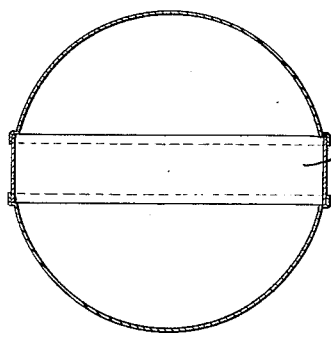
FIG. 14
FIG. 15
INVENTOR
EMIL WERNER ILLGEN
BY *Mason, Porter, Miller & Stewart*
ATTORNEYS United States Patent Office 3,236,080
Patented Feb. 22, 1966

3,236,080
PROCEDURE AND DEVICE FOR THE SHAPING OF CONTAINERS, CONTAINER BODIES OR CONTAINER PARTS, FROM A THIN-WALLED FIRST SHAPE
Emil Werner Illgen, Braunschweig, Germany, assignor to Continental Can Company, Inc., New York, N.Y., a corporation of New York
Filed July 9, 1962, Ser. No. 208,429
Claims priority, application Germany, July 10, 1961, Sch 29,967
19 Claims. (Cl. 72—56)

The invention deals with a procedure and a device for the shaping of containers, container bodies or container parts from a first shape (preshape), and is particularly useful with preshapes which are thin-walled and of plastically shapable non-thermoplastic material, especially materials with a low elongation at break.

The terms "first shape" and "preshape" are employed herein to apply to any part, especially a part of sheet metal which has already been punched, swaged, drawn or extruded so that it exhibits a shape from which it is easy to prepare a complete container, the body of a container, or any part of a container such as the lid of a container.

It is known in the prior art to blow or injection-mold containers, container bodies or container parts from thermoplastic polymers inside a mold, and to shape and simultaneously fill such container etc. by placing the preshape, which is closed at one side, in a mold, after which the filler liquid is pumped under pressure into the preshape so that the preshape is expanded until it contacts the wall of the mold at all points; in this way the container is simultaneously shaped and filled.

The shaping of sheet metals without chip removal, compared to the manufacture of containers from polymers, has heretofore been restricted essentially to the flat and deep drawing of cylindrical and slightly conical containers, because, as a rule, both inside and outside tools are required for the shaping of a metal sheet. As Young's modulus of steel sheet is rather high, a shaping of containers therefrom by extrusion or injection molding, as can be done in the case of aluminum, cannot be done at all, or only under application of a complicated setup, for such steel sheets.

It is already known to prepare hollow articles from aluminum or steel sheets by employing instead of a metal inside tool, a rubber tool having a hollow space which is then filled with a pressure fluid so that the wall of the rubber body will transfer the liquid pressure to the preshape, so that in this way the intimate contact between the preshape and the internal wall of the outer mold is produced.

It is also known to impart shapes to sheet metals by the application of overpressure and/or negative pressure, but for such shaping very high pressures are required, so that an economical exploitation of this known procedure is not feasible.

The present invention sets out a solution of this problem, by providing a procedure for the shaping of containers, container bodies or container parts, in which a very high pressure is employed in an economical manner. Such procedure makes it possible to produce containers of the bodies thereof even if such containers etc. are not round, are not symmetrical and show a cross section which changes from one point to another. This procedure also operates at high speed; and is particularly suitable for the mass production of containers or container bodies.

This problem, according to the present invention, is solved by placing the preshape in a mold which is shaped as a multiple die, can be closed and will withstand pressure; the preshape is clamped at the region of the one or more edge zones; a propellant or a detonating explosive, preferably a gas or gas-liquid mixture which is flammable is placed into the space closed off by the preshape; this gas or mixture is ignited, and the combustion or explosion produces a gas mixture which thereafter is removed.

In this new procedure, the high pressures which arise for a short time only during the combustion may be controlled similarly to those in an internal combustion engine, without encountering trouble with respect to sealing. Furtherfore, the operation step requires only a small amount of time, so that with appropriate construction of the device for practice of the procedure a rapid work sequence can be attained.

The procedure according to the invention may be easily adapted to the production of several container bodies or container parts from one common preshape, with the production occurring simultaneously in one single mold. Thus, two beaker-shaped containers or container bodies, can be made in one single shaping operation. It is also possible to shape two or more tubular container bodies by the application of one single compression shock, for which all that is necessary is the employment of one appropriately shaped die, into which one appropriately shaped preshape is introduced, which, after it has been given its final shape, will be cut transversely to its longitudinal direction.

In further development of the procedure according to the invention, additional embossings and/or holes can be produced in the wall of the formed shape, which can be done, if so desired, by the action of pressure created inside the mold, when the final shape is created from the preshape. Such embossings can be easily produced by imparting the desired shapes to the internal wall of the die. If it is desired to produce shaping and embossing and also perforating of the container walls under the action of the pressure, then first propelling fuels, and thereafter detonating explosives, are caused to act. If the fuel is first used, as a rapidly burning gas-air mixture or a gas-liquid-air mixture, then this will create a pressure during its combustion which causes the forming and the embossing of the final shape from the preshape, whereas the shock wave which occurs after the explosive has been detonated will stamp out the openings, and all other parts of the final shape are simply pressed against the wall of the die. It is self-evident that small amounts of the detonating explosives can be employed, as otherwise the pressures created may get out of hand.

As rather high temperatures are created at the combustion of the fuel or at the detonation of the detonating explosive inside the mold, another characteristic feature of the invention is that coatings which have been applied to the preshape, like lacquers and other ones, at spots which later on become parts of the internal wall, are burnt in and/or hardened by the heat of the combustion or explosion.

In order to employ the procedure according to the invention, a mold of at least two portions which overlap where the preshape is to be brought into the new shape, and also at least one lid part which covers the open end of the preshape so that, when the mold is closed, the preshape is completely surrounded, is utilized. If the intent is to work upon a tubular preshape, then both open ends of the preshape should be closed with such a lid part. The fact that the mold can be taken apart at the region of this portion of the preshape whose shape is to be changed, renders it possible to remove the re-formed preshape from the mold after the pressure has acted, even if the shape exhibits, viewed in longitudinal section, a number of diameters and various cross sectional shapes.

The lid portions of the mold can serve to clamp the edge zones, which are located near the open ends of the part to be shaped. These lid portions preferably also carry devices for the accommodation of the explosive or for the introduction of the fuel, as well as for the attachment of the ignition device and also for the accommodation of the waste gas line. When mixtures of air and gas or a mixture of liquid and gas is being employed, it is preferred to place in such lid an inlet valve for said fuel and also an outlet valve for the waste gases as well as a spark plug.

In order to keep the lid and also the other lid parts which act as bottom correctly in their places, according to one preferred embodiment of the invention, the lid is connected to the bottom portion of the mold by tension imparting means, whereas the lateral mold portions are squeezed tightly against each other by means of a pressure ring. It is preferred therewith that the lateral mold portions exhibit a conical exterior, and that the said pressure ring exhibits a corresponding internal conical face so that, when the ring has been put in place, it serves to keep the mold portions together by the frictional force it exerts.

In order to decrease the load or stress at the interstice between the preshape and the mold wall, during the act of reshaping, and in order to be certain that the final shape follows closely the internal wall of the die, the invention provides furthermore that the interstice is connected by suitable openings to the surrounding atmosphere or to a device which creates a vacuum.

When the preshape is clamped into the mold, the inner space thereof which must be filled with the pressure means so as to effect the required expanding of the preshape may be decreased in a rather simple manner by providing construction parts of the mold which extend into the interior of the preshape. These construction parts may also serve as carriers of several ignition devices, such as spark plugs, so as to bring about the simultaneous starting of the combustion at each region inside the mold at one time or, if desired, a controlled combustion can be obtained by the sequence of ignition of the spark plugs through the use of suitable control means.

If one also desires to produce embossings and/or perforations in the walls of the preshape in addition to the imparting of the final shape to the preshape, then all one has to do is to equip the inside of the mold with the corresponding profiles and/or punch (swage) openings.

With the above, and other objects in view that will hereinafter appear, the nature of the invention will be more clearly understood by reference to the following detailed description, the appended claims and the several views illustrated in the accompanying drawings.

In the drawings:

FIGURE 1 is a schematical vertical sectional view through a mold in which a preshape can be expanded to the desired final shape by means of an explosion therewithin, the preshape being shown by dash-dot lines and the final shape by solid lines.

FIGURE 2 is a schematical vertical sectional view of another mold adapted to receive a part to be shaped which normally is in the form of a preswaged piece of sheet metal or a similar piece which is made into a part of a container, such as the lid thereof, the part to be shaped being shown by dash-dot lines and the final shape by solid lines.

FIGURES 3 and 4 are transverse cross sectional views through various preshapes shown by dotted lines and through the finished container bodies shaped therefrom in solid lines.

FIGURE 5 is an elevational view of a container body, the initial shape of the preshape from which the container body is formed being shown in dash-dot lines.

FIGURES 6, 7 and 8 are transverse cross sectional views through various preshapes with FIGURE 7 being taken along the line VII—VII of FIGURE 5, the preshapes being shown by dotted lines and the finished container bodies being shown in solid lines.

FIGURE 9 is a longitudinal sectional view through an unsymmetrical container.

FIGURES 10 and 11 are vertical sectional views and show typical examples of a simultaneous, multiple production of container bodies, the preshapes being shown by dash-dot lines and the final shapes in solid lines.

FIGURE 12 is a vertical sectional view through a container body with various widths of the openings, the preshape being shown by dash-dot lines.

FIGURE 13 is a vertical sectional view showing an example of a conical, plate-like container body.

FIGURE 14 is a vertical sectional view through a container part in the shape of a section of a sphere or calotte.

FIGURE 15 shows a vertical sectional view and the construction of a container incorporating the spherical sections shown in FIGURE 14.

In FIGURE 1 there is shown a device which accommodates a preshape (first shape) 1 which originally is cylindrical in shape, and this shape is indicated by dash-dot lines. The device includes a mold having two body shaping parts 5, which enclose at least that portion of the preshape where the wall thereof is to be imparted another shape. The mold also includes an upper lid 2 and a lid or bottom portion 3. It is clear from FIGURE 1 that the preshape 1 is clamped in place at the ends 9 and 12 thereof by the body shaping parts 5 in cooperation with the lid portions 2 and 3, and the flanging of the ends of the preshape could occur at that moment when the mold parts are brought together. The lid portions 2, 3 are urged towards each other by tensioning devices which are not shown in the drawings, whereas a closure ring 11 will clamp the body shaping halves 5 rigidly against each other. The body shaping halves 5 have a conical outer surface 10 which cooperates with a conical inner surface 13 of the closure ring 11. The closure ring 11 is urged in the direction of arrow 14 by suitable force applying means (not shown) so that the mold parts 2, 3 and 5 create a tightly encased inner space.

In the typical example shown in FIGURE 1, the lid 2 contains an inlet valve 7 and an outlet valve 8. Furthermore, the lid 2 has an inlet opening 15, controlled by the inlet valve 7, through which enters, in the direction of the arrow 17, into the mold and into the interior of the preshape 1, a mixture of gas and air or a mixture of liquid and gas. The lid 2 also has an outlet opening 16 controlled by the outlet valve 8, through which the combustion gases, etc. may be removed in the direction of the arrow 18. The lid 2 furthermore serves to support a spark plug 4.

In order to remove the air which is trapped between the preshape and the internal wall of the mold, and to allow this air to flow off towards the outside of the mold during the shaping of the preshape, the mold is equipped with openings 28 of a very narrow cross section, which either end in a chamber 29 which is connected to a vacuum source by a fitting 30, or are constructed as bores which pass completely through the full wall of the mold. In FIGURE 1, only a few of the openings 28 are shown.

The operation of the device of FIGURE 1 is as follows:

The preshape in the form of a length of tubing is placed first between the lid 2 and the bottom portion 3, and when this is done, due to the special shaping of the lids 2 and 3, there where contact occurs, the edges of the tube will become flanged. Thereafter, the body is shaping parts 5, which move inwardly from the side, will be brought into the position which is shown in FIGURE 1, and are pressed tightly against each other by the downward movement of the closure ring 11. A precompressed fuel mixture under a high pressure is introduced into the inlet opening 15, across the inlet valve 7, and into the internal space 6 of the preshape. The inlet valve 7 is closed and after the closing of the valve 7, the fuel mixture, which is now under pressure inside space 6, is ignited by means of the spark plug 4 and the fuel mixture exploded is burnt to shape the preshape in a manner to be described hereinafter. After the fuel mixture is burnt and the preshape has been shaped to correspond to the mold, the valve 8 is opened, and the exhaust gases pass through the outlet opening 16. One may then actuate again the inlet valve 7 or a special air valve (not shown), for the purpose of flushing out the interior of the mold with fresh air if this is found to be necessary. After the opening of the body shaping parts 5 and after the bottom and lid portions have been lifted off, the shaped part may be removed. The shaped part will now have the outline which is shown in FIGURE 1 by solid lines and is designated there by the numeral 1A.

In the typical example of FIGURE 2, where the parts which occur also in FIGURE 1 have been designated by the same reference numerals, a device is shown which operates similar to a deep drawing device. The device of FIGURE 2 includes mold halves 5a, 5b which are strongly clamped together by tensioning means, which are not shown in the drawing, and which flange a planar preshape 1B around the edge thereof by virtue of the design of the mold halves 5a, 5b at 9a.

The shaped container part formed from the preshape 1B is shown in solid lines and identified by the numeral 1C. The container part 1C has a nipple at 25 which has been created under the action of the pressure within the mold halves and which may also carry a screw thread if the mold is provided with the corresponding profile. When a screw thread is formed on the nipple 25, it is necessary to subdivide the mold portion 5b along the direction of the line so that the container part 1C can be removed from the mold. Also, in the typical example of mold according to FIGURE 2, bores 28 of a small cross section are provided to remove the air which is normally entrapped underneath the shaped part 1C. In the drawing only a few of these bores have been shown, and the scale of the bores 28 is much larger than that of the remaining parts of the drawing.

Due to the lateral location of the spark plug 4, and due to the profile of the hollow space which is enclosed by the two mold halves 5a, 5b, the ignition of the fuel mixture results in a pressure wave or shock wave starting from the spark plug and moving into the wedge shaped, tapered-off portion between the not-yet-shaped part of sheet metal 1B and the upper portion 5a of the mold, and is reflected in this region by the wall of the mold, so that it can exert a very intensive strain upon the preshape 1B in this region of the mold aligned with the nipple 25 of the finally shaped part 1C. Thus, by providing the wall of the mold half 5a with certain profiles, one may create special effects by the reflection of the pressure waves.

By the application of devices similar to that shown in FIGURE 2, the container shapes shown in FIGURES 13 and 14, which shall be described below, may be easily manufactured, and the mold portions may have profiles simpler than the ones shown in FIGURE 2. Furthermore, when container parts to be formed have a symmetrical configuration, as is shown in FIGURES 13 and 14, the spark plug 4 may, in similarity to the typical example of FIGURE 1, be placed between the inlet and the exhaust valve in the plane of symmetry of the container part which is to be shaped.

Instead of introducing a fuel mixture one may also introduce hot air, which is under pressure, into the hollow space 6, and an injection pump (not shown) may be used to inject liquid fuels into the compressed hot air to provide an arrangement which generally operates according to the diesel system.

The operation of valve for controlling the flow of fuel as well as the preparation and feeding of the fuel mixture which is ready to be ignited, may be accomplished in the ways presently utilized with internal combustion engines.

The movement and clamping together of the mold components to form a seal between the preshape and the mold components may be accomplished not only in the manner shown in FIGURE 1, but also in any other manners, such as by aid of clamping rings, annular springs, etc.

The devices constructed according to the invention are particularly suitable for mass production. Thus, several identical or different molds can be located upon a rotating platform, and the various operation steps are undertaken at the various stations along which the platform passes. With such a setup it is quite feasible to replace the valves by a central control mechanism, for example, one having inlet slots which have a sluice gate or a rotary slide valve.

When utilizing the diesel principle, the fuel is not restricted to diesel fuels in that it is well known to utilize injection pumps for gasoline, and it is possible to operate a diesel combustion system using gasoline. If desired, the high pressure required for operation of the device with the diesel principle may be created by a piston (not shown) which is shifted in parallel to the shape imparting device immediately before ignition of the fuel.

In FIGURES 3 through 15, there are illustrated the different shapes of the container components which one may produce by following the above outlined procedure in accordance with the invention. In the examples shown in FIGURES 3 through 12, the preshapes are thin-walled, drawn or welded or even extrusion-molded tubes. In the examples shown these tubes are round, as the applications of round lids and bottoms are visualized. However, no problem would be involved in changing the procedure to utilize tubes other than round tubes.

In all of the several figures where cross sections are shown, the preshape is always shown in dash lines, whereas its shape at the end of the operation is shown in solid lines.

In the typical example shown in FIGURE 3, the preshape is a round tube, shown by dash lines, wherein the wall thickness changes around the circumference thereof. The different wall thicknesses are provided due to the fact that during the shape imparting operation the various regions of the wall are subjected to different stretchings or expansions. The cross section of the container body, once it has its final shape, is approximately elliptical as is shown in FIGURE 3, but the upper and the lower ends of the container body remain round to accommodate the usual round lids. In order to create at the ends of the container body even wall thickness, the upper and lower end of the tubular section may be worked upon prior to the deformation by a chip-removing tool, which cuts the ends in the desired manner in a fully automatic operation (not shown).

By following the procedures of this invention, shapes which could never be produced in any procedure known to prior art may be created, and thus one may produce from round tubes container bodies which have round cross sections at their upper and lower ends, but have cross sections other than round elsewhere. Other examples of these container bodies are shown in FIGURES 4 through 8.

In the example shown in FIGURE 4, the central portion of the container body has a square cross section, whereas the upper and the lower ends each has a circular cross section.

In FIGURE 5 there is shown a container body which has lateral bulges in the central portion thereof, whereas the upper and lower ends of the container body have the usual circular cross section, so that the ends can accommodate normal can ends. FIGURE 7 is a sectional view along line VII—VII of FIGURE 5.

In FIGURES 6 and 8 there are shown other cross sections of container bodies which in their central portion have a shape which is other than round.

In FIGURE 9 there is shown a longitudinal section through a symmetrical container which may be produced in accordance with the invention.

In FIGURE 10 there is shown the multiple production of container bodies obtainable utilizing a single mold. The individual container bodies here are shaped from one common, tubular preshape, and after the explosion pressure has acted on the preshape and created the shape which is shown by solid lines in FIGURE 10, the individual container bodies are separated at the location of the unshaped strips 19. In this manner, individual container bodies 20 are created. The preshape may be scored at the position of the connection strips 19 prior to the shape imparting operation, whereby the individual container bodies 20 may be separated easily from each other by a simple break-off motion.

In FIGURE 11 there is shown an example of the multiple manufacture of conical containers. After the final shape is obtained, as indicated by the solid lines, the double container body created is separated along the dash-dot line 21, and this way two conical containers are produced. This multiple manufacture is not limited to two container bodies in that several such double set-ups as is shown in FIGURE 11 may be placed in series so that a plurality of such containers may be produced in one operation step in a manner similar to the one shown in FIGURE 10.

In FIGURE 12 there is shown a typical example of an operation which starts out with a preshape having end openings of different diameters. The preshape, as shown by dash-dot lines, consists of a cylindrical portion 22 and a conical portion 23, which after the explosion pressure has acted, are changed into the shape indicated by solid lines.

In FIGURE 13 there is shown a flat-drawn box which generally has the shape of a dinner plate. When manufacturing such a container, the preshape is in the form of a clamped-in plate of sheet metal upon which the explosion pressure acts, whereby with the cooperation of a corresponding die, the dish-like shape shown in solid lines is created. A design of the container which is different from the one shown in FIGURE 13, but which may be manufactured exactly as explained for FIGURE 13, is shown in FIGURE 14; the container of FIGURE 14 having the shape of a spherical segment or calotte. Such spherical segments, as is best shown in FIGURE 15, may be put together so as to form generally spherical packaging members with the interposition of a short spherical part 24. It is self-evident that instead of a small cylindrical part 24, other parts including an elongated cylinder may be placed between said spherical parts, so that containers of correspondingly different shapes may be manufactured.

I claim:

1. A process of shaping container components including container bodies, container ends, and container end portions, said process comprising the steps of placing a three-dimensional preshape which is thin-walled and can be plastically deformed into a mold, closing the mold about the preshape and in sealed relation thereto and simultaneously flanging the preshape by said closing, delivering a combustible and explosive fuel mixture into the interior of the preshape, igniting the fuel mixture to effect an explosion within the preshape with the resultant reshaping thereof to correspond to the profile of the mold, and then exhausting the combustion gases from the mold.

2. A process in accordance with claim 1 wherein a plurality of interconnected container components are simultaneously formed from a single preshape inside a single mold.

3. A process in accordance with claim 2 wherein the preshape is prescored to facilitate the separation of the container components.

4. A process in accordance with claim 1 wherein in addition to the changing of the shape of the preshape, embossing is accomplished.

5. The process of claim 1 wherein the fuel mixture may include any one of a plurality of fuels including an internal combustion engine fuel, a detonating explosive and a combustible gas.

6. The process of claim 1 wherein the fuel mixture includes an internal combustion engine fuel and a detonating explosive utilized in sequence.

7. The process of claim 1 wherein a coating previously applied to the preshape is caused to harden by the heat created in the combustion of the fuel mixture.

8. A device for explosive forming of container components comprising a mold of at least a two-piece construction of which one piece is a lid, said mold pieces having cooperating surfaces for clamping and flanging a preshape therebetween in sealed relation, and said lid having means for introducing a fuel mixture into said mold, means for exhausting exhaust gases from said mold and ignition means for igniting said fuel mixture.

9. A device in accordance with claim 8 wherein said mold pieces also include a laterally split central portion and a bottom, means for clamping together said central portion, and other means for urging together said lid and said bottom.

10. A device in accordance with claim 9 wherein said lid and said bottom have surfaces for engaging the ends of a tubular preshape and flanging the same as said lid and said bottom are brought together in the closing of said mold.

11. A device in accordance with claim 9 wherein said central portion has a conical outer surface and said clamping means include a clamping ring having a complemental conical inner surface.

12. A device in accordance with claim 8 wherein the portion of the mold against which the preshape is to be formed has a plurality of vent openings to prevent the trapping of air between the preshape and the mold.

13. A process of shaping container components including container bodies, container ends, and container end portions, said process comprising the steps of placing a three-dimensional preshaped container component which is thin-walled and can be plastically deformed into a mold, closing the mold about the preshaped container component in sealing relation thereto and simultaneously flanging the preshaped container component by said closing, delivering a combustible and explosive fuel mixture into the interior of the preshaped container component, igniting the fuel mixture to effect an explosion within the preshaped container component with the resultant reshaping thereof to correspond to the profile of the mold, and then exhausting the combustion gases from the mold.

14. A process of shaping a preshaped sleeve configured container body, comprising the steps of placing a preshaped sleeve configured container body into a mold, closing the mold about the container body and in sealing relation thereto and simultaneously flanging the container body, delivering a combustible and explosive gaseous fuel mixture into the interior of the container body, igniting the fuel mixture to effect an explosion within the container body with the resultant reshaping thereof to correspond to the profile of the mold, and then exhausting the combustion gases from the mold.

15. A process of shaping a substantially flat thin-walled sheet of plastically deformable material, said process comprising the steps of placing the material between clamping portions of a mold, said mold having upper and lower mold halves having profiles of generally opposite contours whereby the deepest portion of the upper mold half is opposite the shallowest portion of the lower mold half, delivering a combustible and explosive fuel into the upper mold half, igniting the fuel in the deepest portion of the upper mold half to effect an explosion within the upper mold half with the resultant shaping of the flat sheet to correspond to the profile of the lower mold half, and then exhausting the combustion gases from the mold.

16. The process of claim 15 in which the flat thin-walled sheet is flanged simultaneously with the clamping action of the mold.

17. A device for explosive forming of container components comprising a mold of at least a two-piece construction of which one piece is a lid, said mold pieces having cooperating surfaces for simultaneously clamping and flanging a preshaped container component therebetween in sealed relation, and said lid having means for introducing a fuel mixture into said mold, means for exhausting exhaust gases from said mold and ignition means for igniting said fuel mixture.

18. A device for explosive forming of container components comprising a mold of at least a two-piece construction of which one piece is a lid, said mold pieces having cooperating surfaces for clamping a preshape therebetween in a sealed relation, and said lid having means for introducing a fuel mixture into said mold, means for exhausting exhaust gases from said mold and ignition means for igniting said fuel mixture, said mold pieces also including a laterally split central portion and a bottom, means for clamping together said central portion and other means for urging together said lid and bottom, said central portion having a conical outer surface, and said clamping means including a clamping ring having a complemental conical inner surface.

19. A process of shaping a preshaped sleeve configured container body, comprising the steps of placing a container body into a mold, closing the mold about the container body in a sealing relation thereto and flanging the container body by said closing, delivering a combustible and explosive gaseous fuel mixture into the interior of the container, igniting the fuel mixture to effect an explosion within the container with the resultant shaping thereof to correspond to the profile of the mold, and then exhausting the combustion gases from the mold.

References Cited by the Examiner

UNITED STATES PATENTS

| 939,702 | 11/1909 | Jones | 113—44 |
| 2,935,038 | 5/1960 | Chatten | 29—421 |
| 3,065,720 | 11/1962 | Rardin | 113—44 |

FOREIGN PATENTS

| 1,262,317 | 4/1961 | France. |
| 752,943 | 3/1953 | Germany. |

OTHER REFERENCES

"Materials in Design Engineering," vol. 49, #2, February 1959, Reinhold Publishing Corp., N.Y., pp. 82–87.

CHARLES W. LANHAM, *Primary Examiner.*

MICHAEL V. BRINDISI, *Examiner.*